Sept. 15, 1925.
R. S. PLEXICO
BRAKE LEVER FOR AUTOMOBILES
Filed Nov. 5, 1924
1,553,716
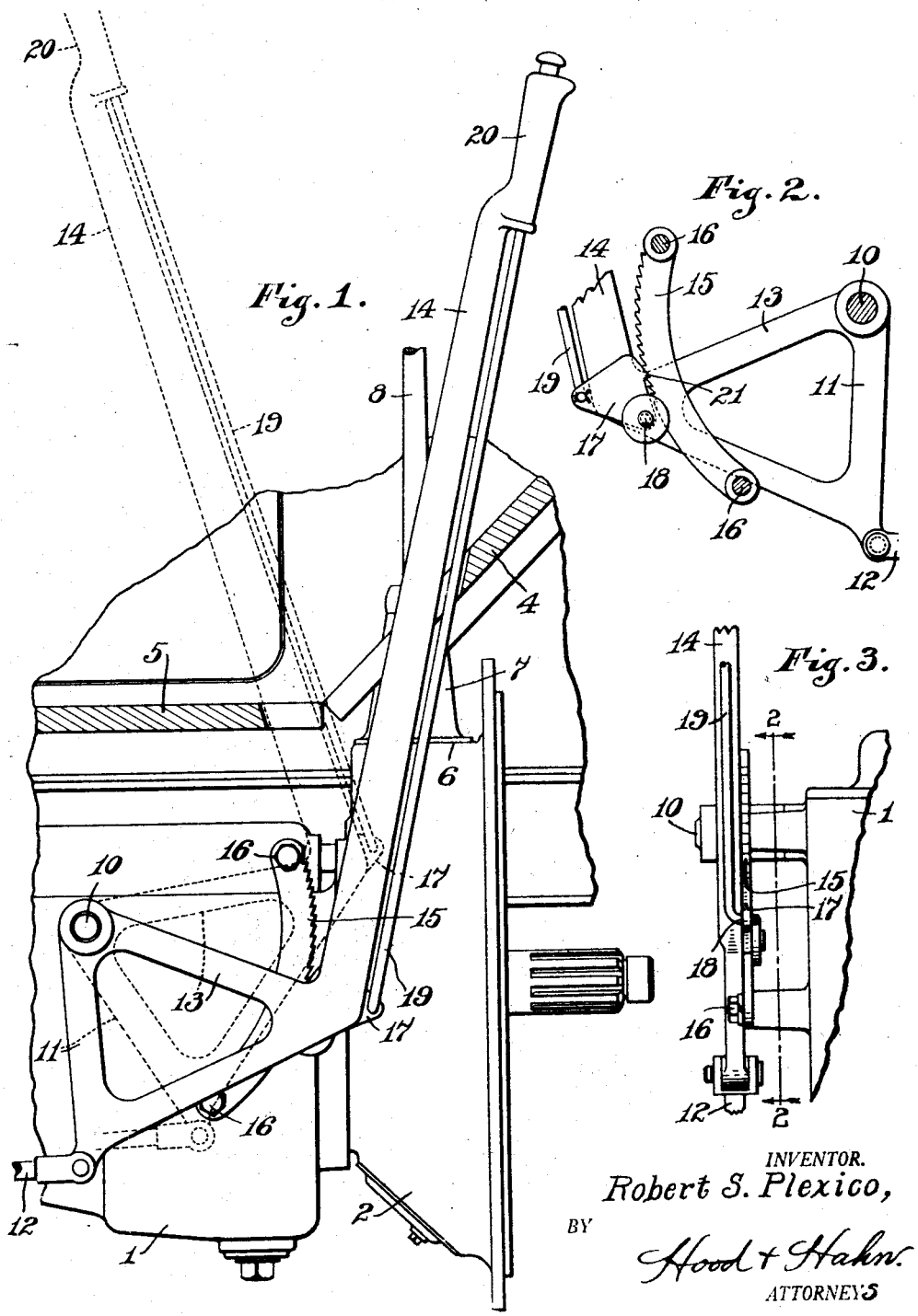
INVENTOR.
Robert S. Plexico,
BY
Hood + Hahn.
ATTORNEYS Patented Sept. 15, 1925.

1,553,716

UNITED STATES PATENT OFFICE.

ROBERT SPRATT PLEXICO, OF MUNCIE, INDIANA, ASSIGNOR TO WARNER GEAR COMPANY, OF MUNCIE, INDIANA, A CORPORATION OF INDIANA.

BRAKE LEVER FOR AUTOMOBILES.

Application filed November 5, 1924. Serial No. 747,885.

*To all whom it may concern:*

Be it known that I, ROBERT SPRATT PLEXICO, a citizen of the United States, residing at Muncie, in the county of Delaware and State of Indiana, have invented a new and useful Brake Lever for Automobiles, of which the following is a specification.

My invention relates to improvements in the mounting of the control levers for automobiles and has for its particular object the mounting of the levers, including the hand brake lever, in such a manner that the floor space in front of the driver's seat is left substantially clear, whereby there will be no obstruction to the entry of the driver from the right hand side of the car.

My invention has particular reference to the construction and mounting of the "emergency" or hand brake lever to give a wide clearance between the lever and the front of the driver's seat.

For the purpose of disclosing my invention I have illustrated one embodiment thereof in the accompanying drawings in which Fig. 1 is a side elevation of the clutch housing and transmission housing of a unit transmission showing the hand lever mounted in position and showing so much of an automobile as is necessary for understanding, partly in section;

Fig. 2 is a detail view of the mounting of the brake lever dog taken on the line 2—2 of Fig. 3, and Fig. 3 is a detail end elevation of the brake lever and its mounting.

In the embodiment illustrated the transmission housing 1 and clutch housing 2 are connected to provide the usual type of unit transmission. The clutch housing, as illustrated, is preferably located below the toe board 4 of the automobile, while the transmission is located beneath the floor board 5 lying in front of the driver's seat. This is the usual position of these parts. The clutch housing 2 is preferably flattened on its upper side to provide a substantially horizontal shoulder 6 on which is mounted the pedestal 7 for the transmission shifting lever 8. This arrangement, it will be noted, positions the transmission lever forward of the floor board so that the pedestal 7 and lever 8 extend up through the toe board thereby leaving the space in front of the driver's seat clear of the transmission lever.

The brake lever is pivoted on one side of the transmission housing 2 on a pivot stud 10 and comprises a bell crank arm having one leg 11 which extends downwardly in substantially vertical position and has means at its lower end for connecting thereto the brake rod 12. The opposite leg 13 extends substantially forward in a more or less horizontal position and is provided at its forward end with the brake lever arm 14 which projects at right angles to the leg 13 and upwardly through the toe board 4 in a position substantially parallel with the gear shifting lever 8 and its pedestal 7. By thus pivoting the brake lever on the rear corner of the bell crank the arc of travel of the brake lever handle is such that the operator may exert the most advantageous pulling effort on the handle. By this arrangement the handle during its arc of travel is always substantially at right angles to the forearm of the operator during his normal movement in manipulating the brake lever.

The arcuate toothed brake sector 15 is also mounted on the side of the transmission housing on suitable studs 16 projecting from the housing and extends in a substantially vertical direction. Co-operating with this toothed sector 15 is a locking member preferably in the form of a triangular dog 17 which at one corner of the triangle is pivoted at 18 to the lever 14 and at the opposite corner on the base of the triangle is connected to a releasing rod 19 extending parallel with the lever 14 and projecting through the hollow handle 20 of the lever 14. One side of the triangular dog 17 is provided with a dogging tooth 21 adapted to co-act with the teeth of the sector 15 to hold the brake lever in any of its "on" positions.

By the above construction and mounting of the brake lever and pedestal, it is noted that the floor of the automobile is left clear of any obstructions and that both the gear shifting lever and hand brake lever are moved forward to project up through the toe board thereby leaving a clear space in front of the driver's seat so that the driver can enter the driving seat from the right without having to "crawl" over the gear shifting and hand brake levers. Furthermore, in event it is desired to drive with three passengers on the front seat there is ample foot room for all passengers and at the same time the driver will have ready access to his control levers.

I claim as my invention:

1. The combination with a transmission casing, of a brake lever mounted thereon and comprising a bell crank lever having means for connecting one leg thereof to the brake mechanism and an operating lever extending substantially at right angles from the opposite leg thereof.

2. The combination with a transmission casing, of a brake lever mounted on one side thereof and comprising an operating lever extending substantially vertically, a supporting lever extending at right angles thereto and pivoted at its rear end on the side of the transmission casing and a connecting lever extending at right angles to the supporting lever at the pivotal point and connected at its opposite end to the brake mechanism.

3. The combination with a transmission casing, of a brake lever mounted on one side thereof and comprising a bell crank lever pivoted at its angle and having one leg connected to the brake mechanism and an operating arm extending at right angles from the end of the opposite leg, a toothed sector mounted on said transmission casing and extending substantially vertically and a dog mounted on said brake lever and cooperating with said toothed sector.

In witness whereof, I have hereunto set my hand at Muncie, Indiana, this 30th day of October, A. D. one thousand nine hundred and twenty four.

ROBERT S. PLEXICO.